(12) United States Patent
Young

(10) Patent No.: US 8,705,591 B2
(45) Date of Patent: Apr. 22, 2014

(54) GLOBAL NAVIGATION RECEIVER

(75) Inventor: Philip John Young, Northampton (GB)

(73) Assignee: QUALCOMM Incorporated, San Diego, CA (US)

( * ) Notice: Subject to any disclaimer, the term of this patent is extended or adjusted under 35 U.S.C. 154(b) by 929 days.

(21) Appl. No.: 12/741,160

(22) PCT Filed: Dec. 5, 2008

(86) PCT No.: PCT/EP2008/066929
§ 371 (c)(1),
(2), (4) Date: May 3, 2010

(87) PCT Pub. No.: WO2009/071686
PCT Pub. Date: Jun. 11, 2009

(65) Prior Publication Data
US 2010/0238976 A1    Sep. 23, 2010

(30) Foreign Application Priority Data

Dec. 5, 2007  (EP) .................................. 07122385

(51) Int. Cl.
*H04B 1/00* (2006.01)
(52) U.S. Cl.
USPC ........... 375/150; 375/147; 375/140; 375/130; 375/146
(58) Field of Classification Search
USPC .......................... 375/150, 147, 140, 130, 146
See application file for complete search history.

(56) References Cited

U.S. PATENT DOCUMENTS

| 6,044,105 A | 3/2000 | Gronemeyer | |
|---|---|---|---|
| 6,289,041 B1 | 9/2001 | Krasner | |
| 6,829,534 B2 | 12/2004 | Fuchs et al. | |
| 7,173,957 B2 | 2/2007 | Shakeri et al. | |
| 7,185,219 B1* | 2/2007 | Bachmeier et al. | ........... 713/503 |
| 2002/0164046 A1* | 11/2002 | Walker et al. | ................. 382/100 |
| 2005/0234644 A1* | 10/2005 | Lin | ................ 701/214 |
| 2005/0234670 A1* | 10/2005 | Hagen et al. | .................... 702/85 |
| 2007/0213932 A1* | 9/2007 | Yule | ............................ 701/214 |
| 2007/0276616 A1* | 11/2007 | Wilcox | ........................... 702/73 |

FOREIGN PATENT DOCUMENTS

| CN | 101010598 A | 8/2007 |
|---|---|---|
| JP | 2002517843 A | 6/2002 |
| JP | 2002524907 A | 8/2002 |
| JP | 2005528358 A | 9/2005 |
| JP | 2005535880 A | 11/2005 |

(Continued)

OTHER PUBLICATIONS

International Search Report and Written Opinion—PCT/EP2008/066929, International Searching Authority—European Patent Office, May 27, 2009.

*Primary Examiner* — Michael Neff
(74) *Attorney, Agent, or Firm* — Howard Seo

(57) ABSTRACT

A signal processing system and method for a GNSS digital signal wherein a carrier-stripped GNSS signal, is sampled according to a variable rate, determined by the code NCO, and including a timing circuit arranged to generate a timestamp code determining the sampling time of at least one of the samples in the buffer memory. By taking code samples in this way it is possible to transfer the samples asynchronously to a separate processor for the search task to be performed, for example an asynchronous parallel correlator implemented in the same silicon in hardware, or a media processor such as a graphics accelerator implemented in the same device or a separate physical device.

34 Claims, 2 Drawing Sheets

(56) References Cited

FOREIGN PATENT DOCUMENTS

| JP | 2008510160 A | 4/2008 |
| WO | WO0010030 | 2/2000 |
| WO | WO0013332 | 3/2000 |
| WO | 2004015444 A1 | 2/2004 |
| WO | WO2006018803 A1 | 2/2006 |

* cited by examiner

GLOBAL NAVIGATION RECEIVER

FIELD OF THE INVENTION

This patent application claims benefit and priority, under 35 U.S.C. 119, to International Patent Application No. PCT/EP2008/066929 filed on 05 Dec. 2008, which further claims benefit and priority, under the Paris Convention, to European Patent Application No. 07122385 filed on 05 Dec. 2007.

DESCRIPTION OF RELATED ART

FIG. 1 shows schematically a generic realization of a GNSS receiver. The illustrated receiver comprises a first module 101 to do the RF-downconversion and digitization, and a second correlation module 102, usually built around a general purpose processor or a digital signal processor 109, that runs a program for performing the correlation and tracking procedures. Navigation computations are either carried out by an external processor 111, as shown, or by the same signal processor 109. The divisions of the example in FIG. 1 often correspond to an implementation in separate chips or integrated circuits. Single-chip solutions have also been suggested, however.

In a GNSS system the sources are orbiting GNSS Space Vehicles (SV). The case of the GPS is readily extendable to other radiolocalization systems and the following will use this as a base to discuss particular embodiments, being it understood that the invention is not necessarily limited to this particular navigation system. In GPS each space vehicle transmits two microwave carrier signals. The signal L1 at 1575.42 MHz carries the navigation message. The signal L2 at 1227.60 MHz is used among others to measure the ionospheric delay. The L1 and/or L2 signals are modulated with three binary codes:

The C/A Code (Coarse Acquisition) modulates the phase of the L1 carrier signal. The C/A code is a Pseudo Random Noise (PNR) at 1.023 MHz that repeats every 1023 bits (1 millisecond). Each SV uses a different C/A code. This noise-like code spreads the spectrum of the modulated signal over a 1 MHz bandwidth to improve immunity against noise.

The navigation message also modulates the L1-C/A code signal. It is a 50 Hz signal consisting of data bits that describe the GPS satellite orbits, clock corrections and other system parameters.

The P-Code (precise) modulates both the L1 and the L2 signals, and is for use only by authorized users with cryptographic keys.

The task of a GPS receiver is to retrieve the signals received from the various space vehicles that can be seen at a given instant. For that, the circuit of FIG. 1 comprises an antenna 104 whose output signal is amplified in the first RF processor 101 by a low-noise amplifier 105 and down-converted to an intermediate frequency signal (IF signal) in the conversion unit 106. The IF signal often comprises one in-phase (I) and one quadraphase (Q) component, which are converted by analog to digital converter 108 into digital signals (I, Q) delivered to correlator module 102 for further processing.

The function of the correlation block (102) is first to remove any significant residual carrier from the signal delivered by the RF interface (101) and then to de-spread the resulting I, Q signals originating from the various SVs. For that, the correlation stage initially removes the IF using a digital NCO (107) then aligns temporally the incoming signals with locally generated copies of the PRN signals of each existing or likely SV. In order to reduce the computation overhead and the acquisition time, alignment is often performed in the time domain by using dedicated hardware correlators but may also be performed in the frequency domain, by combining an FFT transform of the incoming signals I, Q with FFT transforms of the PRN signals characterizing each SV.

There exist various algorithms used by different manufacturers for carrying out this correlation in the time or frequency domain. However due to the fact that the correlation and de-spreading processes tend to require a lot of processing power. For example, a correlation in the frequency domain requires a lot of processing power for the computation of FFTs, multiplication by the complex conjugates of the FFT transforms of the CA Codes, and Inverse FFT on the results that are needed for a fast time-to-frequency conversion a large computing resource is needed to perform the search process which is usually redundant during the tracking phase. A comparable, if not higher, computing power is required to carry out the equivalent operations in the time domain and is typically performed by a dedicated hardware correlation engine. In addition to the processing requirements this process also requires a large amount of storage for data and results.

The correlator 102 outputs digital processed data that are fed to an acquisition and navigation processor 111 for computing and for displaying position related data, including for example the position of the receiver. The nature of the data output by the correlator may vary according to the receiver's architecture; some modules already deliver the location coordinates while others only deliver intermediary values such as Pseudo Ranges of the orbiting SV's.

In the prior art, the correlator 102 is often built around a dedicated signal processing engine 109 accessing its own data and instruction memory 110. Examples of known correlators include the NJ1030, NJ2020, and NJ3030 baseband processors produced by the applicant.

It is also known to use an FPGA or a dedicated ASIC as a correlator for computing the FFTs and for the various other computations performed by the module 102.

Processors, Asics and FPGA are however expensive, power and space consuming, therefore, the hardware resources 102 required for the correlation and tracking procedures have a significant impact on the price, volume and power-consumption of the overall receiver. Additionally these resources are often dedicated to the GPS algorithm and cannot be used for other purposes even when they are no longer required by the GPS function.

It has also been suggested to use a general purpose CPU 111 in the system for the computation of the FFT required for the correlation. Although general purpose CPUs are fast, the total system throughput is often not fast enough and would require scaling specifically to meet the requirements of the GPS search process. Moreover, this solution makes an inefficient use of the available memory bandwidth and puts a high load on the CPU, thus, blocking it from other tasks.

In high sensitivity GNSS receivers it is often necessary to perform long period integrations over large code phase windows in order to initially detect and locate signals before entering tracking mode. It is known to tackle this problem by using a massively parallel correlation approach where the data are first sampled and carrier-stripped and then buffered in registers so that it can be processed using multiple physical correlator channels operating at a high clock speed asynchronously to the sampling clock. In this solution, however, the samples are not exactly aligned with the modulation code and, therefore, a more complex hardware to perform residual carrier stripping and sample re-alignment in the correlation stage is needed.

It is therefore a goal of the present invention to provide the digital processing power required by a radio positioning signal receiver in a less expensive, less power-consuming and less space consuming way than in the prior art, and in a manner which shares the resources efficiently so that they can also be used for other system functions when not required by the navigation functions.

It is also a goal of the present invention to provide high-sensitivity GNSS receiver with an improved massively parallel correlator, being simpler structure and more economical than the known architectures of this type.

BRIEF SUMMARY OF THE INVENTION

According to the invention, these aims are achieved by means of the object of the independent claims. Other optional features and embodiments are the object of the dependent claims.

In particular these aims are achieved by a signal processing system for a GNSS digital signal comprising spread-spectrum radiolocalization signals received from radiolocalization satellites, each satellite transmitting a radiolocalization signal modulated by a known modulation code, having a Doppler shift and a code phase shift, the signal processor comprising: at least one sampling stage, reading a carrier-stripped GNSS signal, comprising a programmable oscillator which is programmed to generate a reference clock in accord with one predetermined feature of the modulation code of a satellite whose acquisition is intended, accumulation means driven by the programmable oscillator, for generating a number of samples of programmable duration, determined by the reference clock, and one buffer memory, arranged to store the succession of samples produced by the sampling stage, characterized by a timing circuit arranged to generate a timestamp determining the sampling time of at least one of the samples in the buffer memory.

Furthermore these aims are obtained by a processing method corresponding to and executed by the above system, namely by a method of processing a a GNSS radiolocalization signal comprising the steps of: generating or receiving a carrier-stripped GNSS signal comprising spread-spectrum radiolocalization signals, received from radiolocalization satellites, each satellite transmitting a radiolocalization signal modulated by a known code, having a Doppler shift and a code phase shift, piloting a programmable oscillator to generate a reference clock signal in accord with one predetermined feature of the modulation code of a satellite whose acquisition is intended, sampling and optionally accumulating the carrier-stripped GNSS signal at sampling times determined by the reference clock and storing the samples so obtained in one memory characterized by the steps of generating one or several timestamp codes determining the sampling time of at least one of the samples in the buffer memory locating the sampling times of the samples in the buffer memory based on the timestamp codes correlating the samples in the buffer memory with local replicas of the modulation code to generate a plurality of correlation values.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
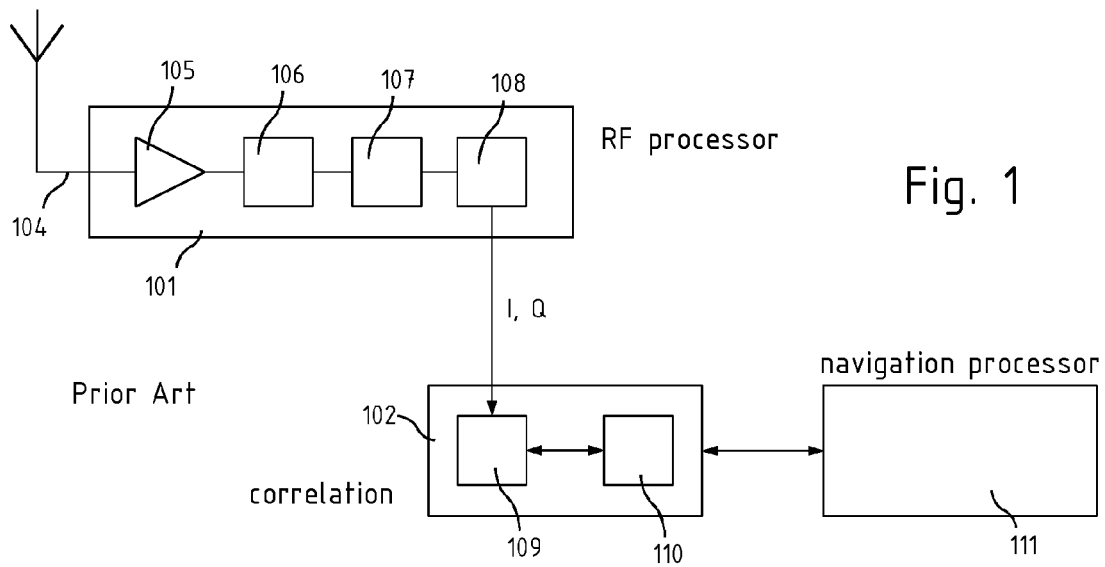
FIG. 1 shows, in a simplified diagrammatic form, a known GNSS receiver.
Figure 2:
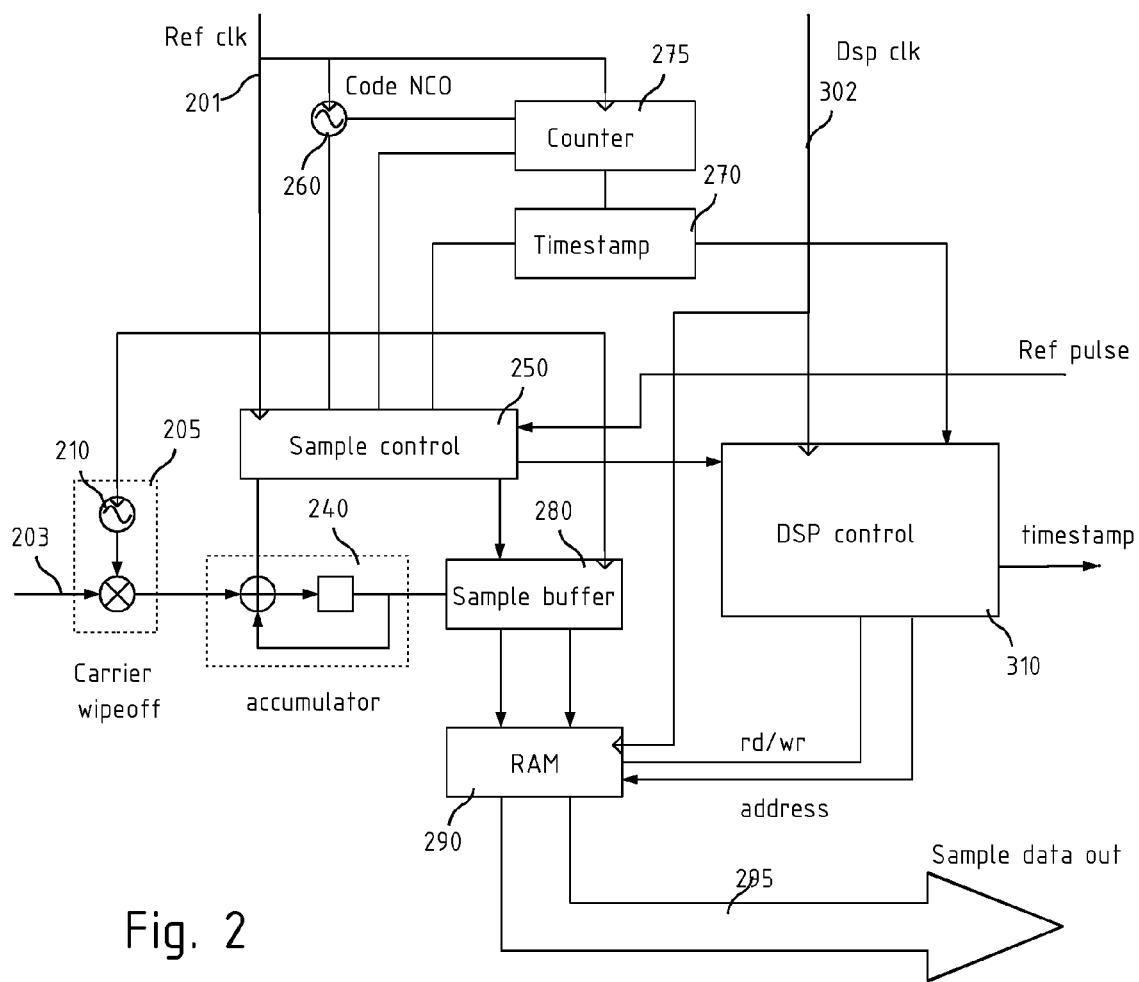
FIG. 2 illustrates schematically the structure of a sampling circuit according to one aspect of the invention The block diagrams of FIGS. 3 and 4 show the structure of a GNSS receiver according to the invention.

FIG. 2 shows schematically a possible implementation of a sampling unit for the GNSS receiver of the invention. At its input, the carrier wipeoff section 205, receives typically a Scalar IF or complex low-IF digital signal 203 and generates a complex carrier-stripped signal, even if this is not represented to simplify the drawing. The carrier NCO 210 is controlled in order to follow the variations of the carrier in the received system and provide a signal with no or very small carrier component, as it is known in the art.

The sample accumulator 240 samples the carrier-stripped signal at a rate that is determined by a reference timing signal provided by the code NCO 260. The code NCO 260 is controlled to generate a timing signal in accord with one predetermined feature of the modulation code of a satellite whose acquisition is intended, for example a timing signal synchronous with the chip rate of the modulation code compensated for the effects of clock drift and Doppler shift. The sample accumulator 240 produces a series of samples of the carrier-stripped signal at a rate n·k which is an exact multiple of the Doppler-shifted chip rate k, for example 4 samples per chip length. Thanks to the fact that the sampling is governed by the code NCO 260, the samples are automatically aligned with the chips of the code whose acquisition is intended, and this alignment will remain over an indefinite period.

The sample controller 250 controls the accumulation of the samples and their alignment in the sample buffer 280, from which they are stored in the sample RAM 290. The sample series in sample RAM 290 are arranged by the sample controller 250 in a circular buffer, for example, or in another format, and are made available to other part of the GNSS system by a suitable interface 285.

A counter 275 and a register 270 are connected to the code NCO 260 to generate a timestamp code determining the sampling time of at least one of the samples in the buffer memory. The timestamp code is a measure of the code phase, at the time the sample is taken, and can be used to align the samples with the searched code, in correlation operations.

To facilitate such alignment it is necessary to relate the exact sample time of the samples in a block to be processed with the known feature of the signal of interest, in this case the code phase. This requires a timestamp reference for each block of data be available, and that such timestamp can be easily related to the code phase requirements.

Since the data is being sampled synchronously to the code the NCO 260 is used to control the sample rate to maintain alignment, this NCO is preferably extended to count past the sampling rate and to count the code chips, ideally modulo the code length, and number of complete code epochs.

Using such a timestamp for the data the correct code phase relationship can be calculated simply and without error. Since the samples are typically stored in a cyclic buffer in RAM 290, it would not be desirable to generate and store a timestamp code for each sample. However as data samples are obtained synchronously with the code NCO 26, this is not strictly necessary, and it is sufficient to keep the timestamp for one sample in one continuous block to understand the relationship between all the samples in the block and the code phase. This is enough to allow asynchronous parallel correlation of the collected samples, as it will be described later.

In the illustrated example, data is sampled and buffered in sample buffer 280, and then written in short transfers into RAM 290 implementing a circular buffer, in this case one solution is to keep the timestamp of the sample most recently written into the RAM, from this the timestamp of the oldest sample is determined by a simple subtraction of a constant value.

The DSP control unit 310 generates the required control signals to allow memory access, samples the timestamps codes and stores them in the sample RAM 290, or makes them available to other components.

The samples in the RAM 290 can be transferred asynchronously to a separate processor, or search engine, for the search and acquisition tasks to be performed. The separate processor could be, for example an asynchronous parallel correlator implemented in the same silicon chip as the sampler circuit of FIG. 2, or on a separate silicon die or on a separate physical device, having access to the samples stored in sample RAM 290 by a suitable interconnection bus.

Figure 3:
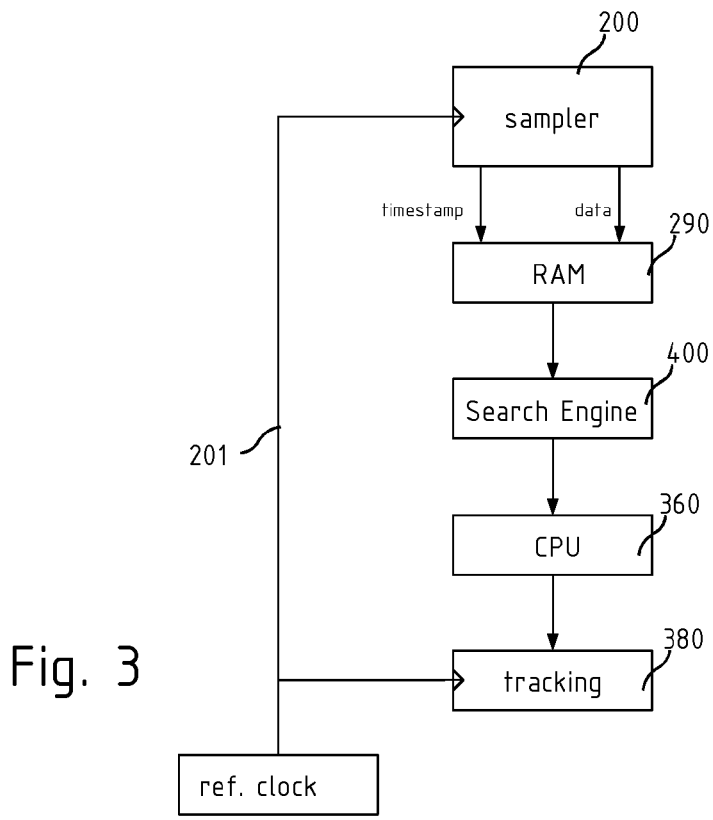

FIG. 3 represents a simplified structure of a GNSS receiver according to one aspect of the invention. The data are stored by sampler 200 into the sample RAM 290, together with the timestamps that allow assigning each sample to a definite time, or code phase. The search engine 400 comprises one or several fast correlators, arranged to correlate the samples in the buffer memory with local replicas of the modulation codes to generate a plurality of correlation values. The correlators are preferably operated at high clock speed asynchronously to the sampling speed, and can therefore provide, by known time-multiplexing techniques, a very large number of correlation values, or "taps" in the Doppler shift/code phase search space. The correlation can either be performed in the frequency domain (FFT correlation) or in the time domain.

According to the chosen design, the search strategy implemented in the search engine 440 can be quite elaborate including, for example a first search stage, or "skimmer" performing a first search in a large search space including on a great number of taps, followed by a more precise search stage, or "distiller", operating with finer resolution and sensitivity on those taps that have yielded a high correlation value in the first stage. The invention however is also applicable to different search engines. Importantly the timestamp codes allow the search engine 400 to identify the code phase of each sample taken into account in the correlation, independently from the time at which the correlation takes place. This allows a fully asynchronous operation of the search engine 400.

Once the search engine has identified a suitable number of taps potentially containing genuine satellite signals, these are handed over, by the CPU 360, to the tracking module 380, which is responsible for confirming and then following the satellite signals in frequency and phase. These are utilized to obtain position and navigation information, as it is known in the art. This requires transferring the knowledge of the code phase between separate independent engines, also the detection of the signal will have a processing latency associated with it, this requires some way to predict the relationship between the phase of the next tracking or search confirmation channel and the data samples used for the previous search process.

By implementing a reference time signal of some sort, such as a ms tick pulse, and using this signal to measure the phase of both of these engines at a point in time this process becomes possible the relative phase of the SV PRN code to this time reference can be calculated and used to initialize the new channel.

For example, using a regular ms pulse the phase of the data sample counter can be sampled at one ms, intervals the phase of the detected signal being known in relationship to the sampled data it then becomes a trivial task to extrapolate the exact phase of the code at a future ms Tick in relation to any occurrence of this event, this can then be used to initialize the code generator of the tracking engine at a known event such that it is precisely centred on the code phase of interest.

Figure 4:
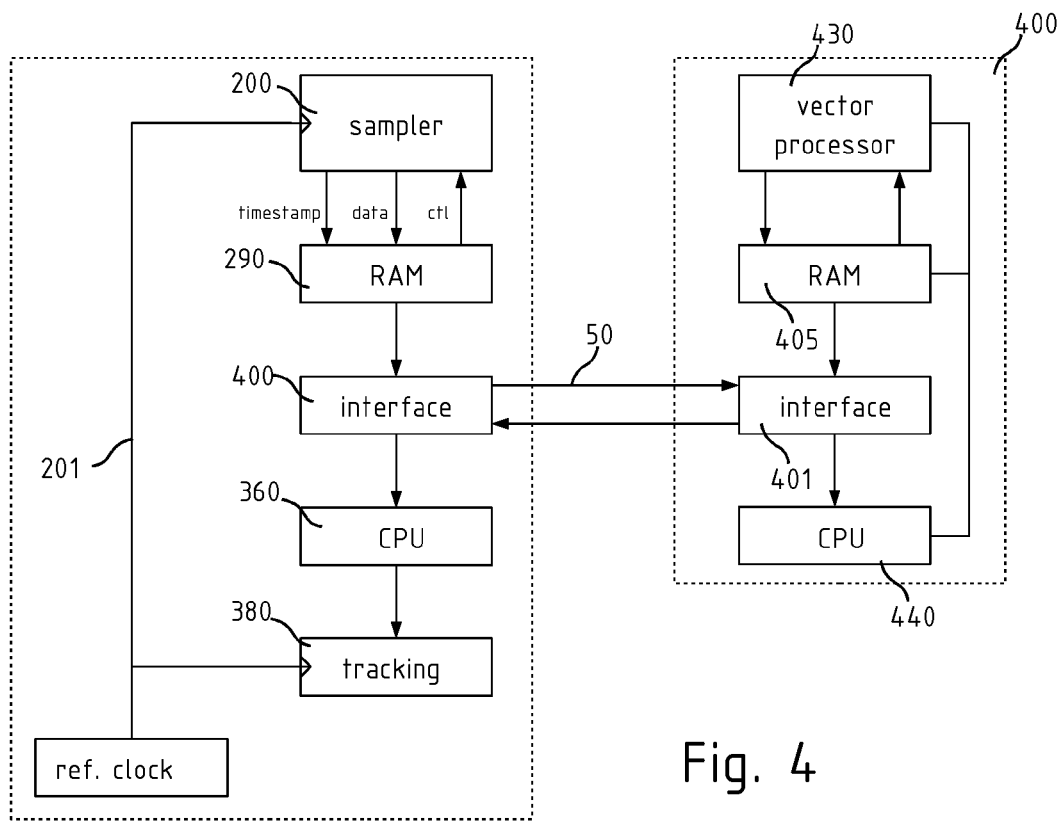

In the case in which the search engine 400 is in a separate device, a preferable communication channel would be a high-speed serial bus, for example a Hi-speed USB, USB 3.0 or FireWire interface 50 as shown in FIG. 4. In this case the search engine includes a separate CPU 440, a serial interface 401, corresponding to a compatible interface 402 on the other side of the bus link 50, a service RAM 405, and a vector processor 430, which is used to compute correlation and/or Fourier transformations with high speed and efficiency. In order to achieve this when using an external processor, such as a graphics processor connected over a serial bus, it is necessary to associate the exact timestamp of each data sample set sent to the processor, for this it is suggested that a packet format be used that transfers each block of data together with the timestamp. If such a packet includes the timestamp at the start of the packet then it is possible to foresee a DMA transport mechanism that utilizes this information to determine for example the exact location where the data should be stored for efficient processing.

In a preferred embodiment, the vector processor is derived from a media processor, such as a graphic/sound processor for a general purpose computer having the required computing power. Alternately, the vector processor is derived from a video game accelerator, such as a physics processor designed to handle the calculations in a physics engine of a video game. This is applicable to the case in which the search module is separate, as in FIG. 4, and also to the previous embodiment of FIG. 3 in which the search engine 400 is integrated in the same device as the other components of the GNSS receiver system.

If the search engine 400 is unable to process all the data for all taps, for example a correlator which operates intermittently as bandwidth becomes available, or because the vector processor is used for a series of different tasks in a multiplexed manner, then it becomes necessary to align the samples for the correlation, and pad the missing samples, for example with zeros. This is made possible by the timestamped codes, which allow reconstructing the phase relationship between the code and the samples. There is also the possibility of using a dedicated DMA scheme for transferring non-contiguous data samples to the processor and utilizing the timestamp information to insert padding such as zero's to maintain a coherent data set in the processors memory. Alternatively the data could be transferred by DMA into a buffer list where the start of each buffer might be aligned to a multiple of the code length to simplify the software algorithms and improve memory efficiency.

The invention claimed is:
1. A signal processing system comprising:
   a sampling stage to process a carrier-stripped Global Navigation Satellite System (GNSS) signal, the sampling stage comprising:
      an oscillator to generate a reference timing signal based, at least in part, on a feature of a modulation code of a satellite;
      an accumulator responsive to the oscillator to generate samples based, at least in part, on the reference timing signal;
      memory to store a succession of the samples;
   a timing circuit to generate a timestamp code determining a sampling time of at least one of the samples stored in the memory; and a correlator to correlate the samples stored in the memory with local replicas of the modulation code to generate a plurality of correlation values, wherein the correlator comprises a processor operating asynchronously from the sampling stage to locate a time position of the at least one of the samples based, at least in part, on the timestamp code.

2. The system of claim 1, wherein the oscillator is operatively arranged to oscillate in accord with a chip rate of the modulation code or with some multiple of the chip rate of the modulation code.

3. The system of claim 2, wherein the timing circuit is operatively arranged to oscillate in accord with the chip rate or with some multiple of the chip rate of the modulation code compensated for a Doppler shift and a clock drift.

4. The system of claim 3, wherein the timing circuit generates the timestamp code in response to a reference event where the timestamp code is a measure of a code phase.

5. The system of claim 1, further comprising at least one carrier wipeoff unit to remove a carrier component from a GNSS signal and provide the carrier-stripped GNSS signal.

6. The system of claim 1, wherein the processor comprises at least one of: a vector processor or a graphic accelerator or a media processing engine or a sound processor or a physics processor.

7. The system of claim 1, further including a serial bus arranged to transfer the samples and/or the timestamp code to the processor.

8. The system of claim 1, wherein the timing circuit comprises a counter arranged to maintain a count corresponding to the reference timing signal.

9. A processing method for a Global Navigation Satellite System (GNSS) radiolocalization signal comprising:
with a first circuit:
accessing a carrier-stripped GNSS signal;
generating a reference timing signal based, at least in part, on a feature of a modulation code of a satellite, the modulation code comprising a Doppler-shifted modulation code;
sampling the carrier-stripped GNSS signal at sampling times determined by the reference timing signal;
storing a succession of the samples;
generating a timestamp code determining a sampling time of at least one of the samples in the stored succession of the samples; and
extrapolating at least one sampling time for at least one other sample in the stored succession of the samples based, at least in part, on the timestamp code; and
with a second circuit operating asynchronously from the first circuit:
correlating the samples in the stored succession of the samples with local replicas of the modulation code to generate a plurality of correlation values to locate a time position of the at least one of the samples based, at least in part, on the timestamp code.

10. The processing method of claim 9, and further comprising:
with the second circuit, padding the samples to ensure a coherent correlation in the event of missed data samples.

11. The processing method of claim 9, further comprising: generating the timestamp codes using the reference signal.

12. The processing method of claim 9, wherein the timestamp codes are generated on the occurrences of an external event.

13. The processing method of claim 9, wherein the timestamp value is used to control the alignment of the samples in memory to improve the efficiency of the correlation process.

14. An apparatus for use in processing Global Navigation Satellite System (GNSS) signals, the apparatus comprising:
a oscillator to generate a reference timing signal in accord with one feature of a modulation code of a GNSS signal;
an accumulator responsive to said oscillator, for generating a plurality of samples of a carrier-stripped GNSS signal based on a duration determined by said reference timing signal;
a timing circuit to generate a timestamp code associating a sampling time of at least one of said plurality of samples;
memory to store a succession of said plurality of samples and said timestamp code, and wherein at least one of said plurality of samples stored in said memory is not stored with a corresponding timestamp code; and
a processor to reconstruct a phase relationship for at least said plurality of samples stored in said memory based, at least in part, on at least one said timestamp code stored in said memory, wherein at least a portion of said plurality of samples stored in said memory are obtained by said processor as non-contiguous data samples, and wherein said processor to further generate padding applicable to said non-contiguous data samples based, at least in part on said at least one said timestamp code stored in said memory.

15. The apparatus as recited in claim 14, further comprising:
one or more correlators to correlate said plurality of samples stored in said memory with local replicas of said modulation codes to generate a plurality of correlation values.

16. The apparatus as recited in claim 14, wherein:
said timing circuit is responsive to said oscillator; and
said oscillator to oscillate in accord with a chip rate of said modulation code or a multiple of said chip rate of said modulation code.

17. The apparatus as recited in claim 14, wherein:
said timing circuit to oscillate in accord with a chip rate of said modulation code compensated for a Doppler shift and/or a clock drift, or a multiple of said chip rate of said modulation code compensated for said Doppler shift and/or said clock drift.

18. The apparatus as recited in claim 14, wherein said timing circuit to generate said timestamp code in response to a reference event.

19. The apparatus as recited in claim 14, wherein said timestamp code comprises a measure of code phase.

20. The apparatus as recited in claim 14, further comprising:
at least one carrier wipeoff unit to remove a carrier component from said GNSS signal to obtain said carrier-stripped GNSS signal.

21. The apparatus as recited in claim 14, said timing circuit comprising a counter to count a reference signal of said oscillator.

22. An apparatus for use in processing Global Navigation Satellite System (GNSS) signals, the apparatus comprising:
means for generating a reference timing signal in accord with one predetermined feature of a modulation code of a GNSS signal;
means for generating a plurality of samples of a carrier-stripped GNSS signal based on a programmable duration determined by said reference timing signal;
means for generating a timestamp code associating a sampling time of at least one of said plurality of samples;

means for storing a succession of said plurality of samples and said timestamp code, and wherein at least one of said plurality of samples is not stored with a corresponding timestamp code;

means for reconstructing a phase relationship for at least said plurality of samples based, at least in part, on at least one said timestamp code, wherein at least a portion of said plurality of samples are obtained by said means for reconstructing said phase relationship as non-contiguous data samples; and means for generating padding applicable to said non-contiguous data samples based, at least in part on said at least one said timestamp code.

23. The apparatus as recited in claim 22, further comprising:

means for correlating said plurality of samples with local replicas of said modulation codes to generate a plurality of correlation values.

24. The apparatus as recited in claim 22, wherein said means for generating said timestamp code is responsive to a reference event.

25. The apparatus as recited in claim 22, wherein said timestamp code comprises a measure of code phase.

26. The apparatus as recited in claim 22, further comprising:

means for removing a carrier component from said GNSS signal to obtain said carrier-stripped GNSS signal.

27. A method for use in processing Global Navigation Satellite System (GNSS) signals, the method comprising:

generating a reference timing signal in accord with one predetermined feature of a modulation code of a GNSS signal;

generating a plurality of samples of a carrier-stripped GNSS signal based on a duration determined by said reference timing signal;

generating a timestamp code associating a sampling time of at least one of said plurality of samples;

storing a succession of said plurality of samples and said timestamp code, and wherein at least one of said plurality of samples is not stored with a corresponding timestamp code;

reconstructing a phase relationship for at least said plurality of samples based, at least in part, on at least one said timestamp code accessing at least a portion of said stored plurality of samples as non-contiguous data samples; and generating padding applicable to said non-contiguous data samples based, at least in part on said at least one said timestamp code.

28. The method as recited in claim 27, further comprising:

correlating said plurality of samples with local replicas of said modulation codes to generate a plurality of correlation values.

29. The method as recited in claim 27, wherein generating said timestamp code is responsive to a reference event.

30. The method as recited in claim 27, wherein said timestamp code comprises a measure of code phase.

31. The method as recited in claim 27, further comprising:

removing a carrier component from said GNSS signal to obtain said carrier-stripped GNSS signal.

32. An article comprising:

a non-transitory data storage device having stored therein instructions executable by at least one processor in a Global Navigation Satellite System (GNSS) receiver to:

obtaining from a memory:

a plurality of samples of a carrier-stripped GNSS signal based on a duration determined by a reference timing signal in accord with one feature of a modulation code of a GNSS signal;

a timestamp code associating a sampling time of at least one of said plurality of samples, and wherein at least one of said plurality of samples is not associated with a corresponding timestamp code;

reconstructing a phase relationship for at least said plurality of samples based, at least in part, on at least one said timestamp code;

obtain at least a portion of said stored plurality of samples as non-contiguous data samples; and generate padding applicable to said non-contiguous data samples based, at least in part on said at least one said timestamp code.

33. The article as recited in claim 32, wherein said timestamp code is associated with a reference event.

34. The article as recited in claim 32, wherein said timestamp code comprises a measure of code phase.

* * * * *